United States Patent

Kuwana

[11] Patent Number: 4,897,682
[45] Date of Patent: Jan. 30, 1990

[54] STOP DEVICE FOR PHOTOGRAPHIC CAMERA

[75] Inventor: Minoru Kuwana, Sakai, Japan

[73] Assignee: Minolta Camera Kabushiki Kaisha, Osaka, Japan

[21] Appl. No.: 195,378

[22] Filed: May 13, 1988

Related U.S. Application Data

[63] Continuation of Ser. No. 66,473, Jun. 26, 1987, abandoned.

[30] Foreign Application Priority Data

Jun. 28, 1986 [JP] Japan ............................. 61-152003

[51] Int. Cl.$^4$ .............................................. G03B 9/02
[52] U.S. Cl. ..................................... 354/274; 350/449
[58] Field of Search ...................... 354/274, 270, 271.1, 354/272, 273; 350/449, 450

[56] References Cited

FOREIGN PATENT DOCUMENTS

| L19828 | 10/1955 | Fed. Rep. of Germany ...... 354/274 |
| 45-29581 | 11/1970 | Japan . |
| 50-38735 | 4/1975 | Japan . |
| 53-133430 | 11/1978 | Japan . |
| 55-117135 | 9/1980 | Japan ................................. 354/274 |

Primary Examiner—L. T. Hix
Assistant Examiner—David M. Gray
Attorney, Agent, or Firm—Burns, Doane, Swecker & Mathis

[57] ABSTRACT

A stop device having a plurality of stop blades pivotably disposed about an optical axis with an adjacent pair partially overlapping each other and adapted for defining an aperture opening with their inner edges. Each of the inner edges of the stop blades has a first inner edge portion for partially defining a circular aperture opening when the stop device is set to the full aperture position or a position equivalent thereto and a second inner edge portion for partially defining a substantially circular small aperture opening when the stop device is set to a predetermined intermediate aperture position for providing an aperture opening smaller than that provided in the full aperture position. Accordingly, this stop device is capable of providing the substantially circular aperture opening not only in the full aperture position but also in the predetermined intermediate aperture position.

7 Claims, 5 Drawing Sheets

STOP DEVICE FOR PHOTOGRAPHIC CAMERA

This application is a continuation of application Ser. No. 066,473, filed June 26, 1987, now abandoned.

BACKGROUND OF THE INVENTION

1. FIELD OF THE INVENTION

The present invention relates to a stop device to be incorporated into a lens unit for a camera, and more particularly to the stop device having a plurality of stop blades disposed about an optical axis with an adjacent pair partially overlapping each other in the direction of the optical axis, each of the stop blades being pivotable about a pivotal axis positioned an edge region thereof relative to the peripheral direction of the optical axis to move toward and away from the optical axis, the stop blades together with defining an aperture opening with inner edges thereof.

2. DESCRIPTION OF THE PRIOR ART

According to this type of conventional stop devices, when the stop device is set to its full aperture position, a first inner edge portion of respective stop blades partially defines the full aperture opening, the first inner edge portion being formed arcuate to constitute along with first inner edge portions of the other stop blades a circular aperture opening having a predetermined radius and having the optical axis as its center.

Further, with this type of stop device, as illustrated in FIGS. 7 and 8 showing the prior art, a second inner edge portion a2 disposed more distantly from the pivotal axis than the first inner edge portion a1 and defining an aperture opening 'A' when the stop blades are set to an intermediate aperture position in the middle of their pivotal range is formed straight tangentially along the first inner edge portion a1.

However, with the above-described conventional stop device, although in the full aperture position the arcuate first inner edge portions of the stop blades are placed on the same circle thereby together with defining a perfectly circular aperture opening without any corners, in the intermediate aperture position, as shown in FIG. 8, the small aperture opening 'A' constituted by the straight second inner edge portions a2 is defined to be polygonal. This causes inconvenience to be described next when the stop device is incorporated into a lens unit designed for obtaining a photography having a delicate out-of-focus background image such as portrait photographing.

That is to say, although a portrait photographing using the above-described type of lens is sometimes carried out in the full aperture condition, in many cases, an intermediate aperture condition closed by a few steps from the full aperture condition is preferred for this type of photographing. If the aperture opening is defined polygonal in this intermediate aperture condition, in the worst case the defocused image in the background is defined by the shape of the polygonal aperture opening, conspicuously, or the out-of-focus background image is apt to be somewhat angular as being adversely affected by the polygonal aperture opening, whereby a delicate out-of-focus image desirable for the portrait photographing is not obtained.

The conventional stop devices have attempted to overcome this difficulty of the deterioration of out-of-focus image caused by the polygonal aperture opening by increasing the number of stop blades so as to define the aperture opening to be a nearly circular polygon. However, with this arrangement, because of the increased number of stop blades an adjacent pair of which partially overlaps each other in the closed aperture position, there often occurs damage or abrasion to the stop blades due to their increased mutual sliding contact.

SUMMARY OF THE INVENTION

Therefore, it is the object of the present invention to provide a stop device useful for the photographing requiring a delicate out-of-focus image such as the portrait photographing without increasing the number of stop blades.

In order to accomplish the above object, according to the stop device with a plurality of stop blades related to the present invention, an inner edge of the respective stop blades includes a first inner edge portion for partially defining an aperture opening when said stop device is set to a full aperture position or to an aperture position equivalent thereto and a second inner edge portion for partially defining a small aperture opening when the stop device is set to a predetermined intermediate aperture position, the second inner edge portion being disposed more distantly from the pivotal axis than the first inner edge portion, wherein the first inner edge portion is formed arcuate for defining along with first inner edge portions of the other stop blades a circular aperture opening having a predetermined radius about the optical axis when the stop device is set to the full aperture position or the position equivalent thereto, and the second inner edge portion is formed at least partially arcuate for defining along with second inner edge portions of the other stop blades a substantially circular aperture opening having a radius smaller than the predetermined radius formed by the first inner edge portions about the optical axis when the stop device is set to the predetermined intermediate aperture position.

With the stop device having the above-described construction, when the respective stop blades are pivoted to the predetermined intermediate aperture position, the aperture opening defined by the second inner edge portions of all the stop blades has a circular or substantially circular configuration smaller in radius than the aperture opening defined by the first inner edge portions.

Accordingly, by corresponding the predetermined intermediate aperture position to an aperture position closed by a few steps from the full aperture position, it becomes possible to form the aperture opening not polygonal but perfectly circular or substantially circular both in the full aperture photographing and in the few-step closed aperture photographing without increasing the number of the stop blades.

With this feature, the stop device according to the present invention is especially useful to be incorporated into a lens unit especially designed for obtaining delicate out-of-focus background image photography such as the portrait photography.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

The accompanying drawings illustrate a stop device related to the present invention to be incorporated into a lens unit of a camera; in which.

DESCRIPTION OF THE PREFERRED EMBODIMENT

Figure 1:
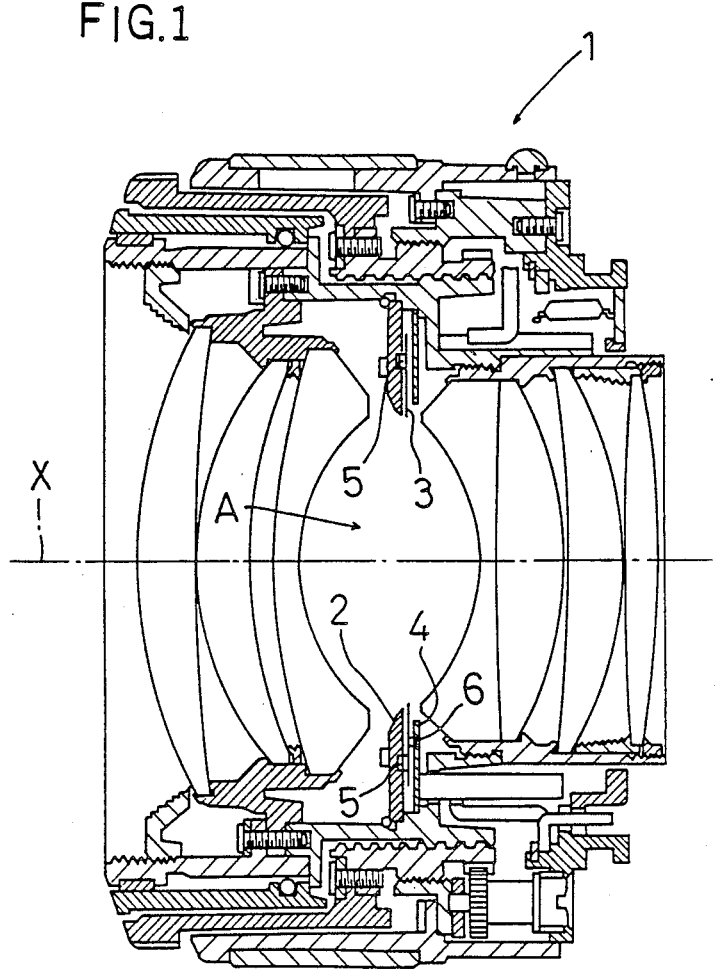
FIG. 1 is a vertical section of the stop device incorporated into a lens unit.
Figure 2:
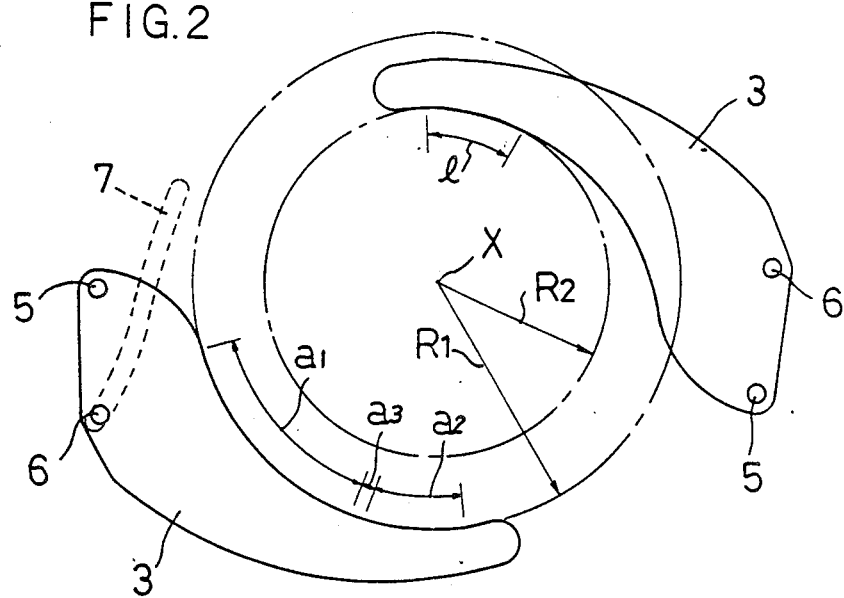
FIG. 2 is a front view showing a configuration of stop blades of the stop device.

FIG. 1 shows a stop device to be incorporated into a lens 1 of a photographic camera. As also shown in FIG. 2, to a stop holding ring 2 disposed coaxial with an optical axis 'X', a plurality of stop blades arranged about the optical axis 'X' with one adjacent pair partially overlapping each other are pivotably attached to pivot pins 5, whereby each of the stop blades is pivotable about the pivot pin 5 positioned in its end region relative to the peripheral direction of the optical axis so as to move away from and toward the optical axis and at the same time the stop blades together with define an aperture opening with their inner edge portions. Further, in a circular operable plate 4 freely rotatable about the optical axis 'X', there is formed a cam groove 7 for pivoting in unison the respective stop blades 3 in response to a rotation of the operable plate 4 by engaging a pin 6 on the respective stop blades 3 with the cam groove 7. That is to say, the stop device is constituted essentially by the stop holding ring 2, the stop blades 3 and by the operable plate 4.

As shown in FIG. 2, each of the inner edges of the stop blades 3 for defining the aperture opening includes a second inner edge portion a2 positioned more distantly from the pivot pin 5 than a first inner edge portion a1 for defining an aperture opening 'A' when the stop device is set to a full aperture position in which the respective stop blades are positioned most distantly from the optical axis 'X'. The second inner edge portion a2 defines a small aperture opening 'A' when the stop device is set to a predetermined intermediate aperture position in which the stop blade is pivoted to a predetermined postion in the middle of its pivotal range.

The first inner edge portion a1 is formed arcuate tracking a circle of a predetermined radius R1 centering about the optical axis 'X' in the full aperture position.

On the other hand, the second inner edge portion a2 is formed arcuate tracking another circle of a predetermined radius R2 shorter than the radius R1 and centering also about the optical axis 'X' in the predetermined intermediate aperture position. If the number of the stop blades 3 is 'n' and the peripheral length of the aperture opening 'A' defined when the stop device is set to the predetermined intermediate aperture position by pivoting the stop blades 3 is 'L', the length l of the second inner edge portion a2 having the predetermined radius R2 is expressed by the following equation:

$$l = \frac{L}{n}$$

As the result, in the predetermined intermediate aperture position, the small aperture opening 'A' is formed as a perfect circle of the predetermined radius R2.

It is to be noted that a third inner edge portion a3 bridging the first inner edge portion a1 and the second inner edge portion a2 has a curvature for providing a smooth transition connecting these edge portions a1 and a2 each other.

Also, the aforementioned predetermined intermediate aperture position specifically comprises an aperture position closed by stopped down by 1 AV (aperture value) from the full aperture position.

Figure 3:
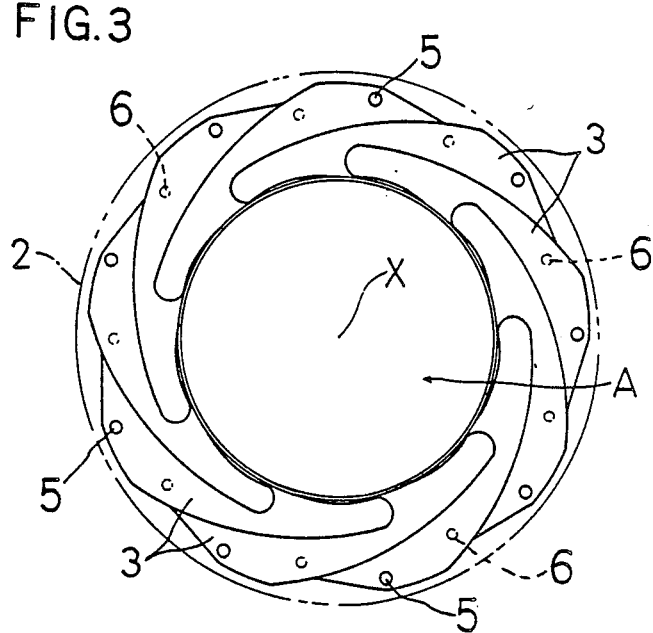
FIGS. 3 through 6 are front views showing aperture opening configurations of the stop device set to respective aperture positions.
Figure 4:
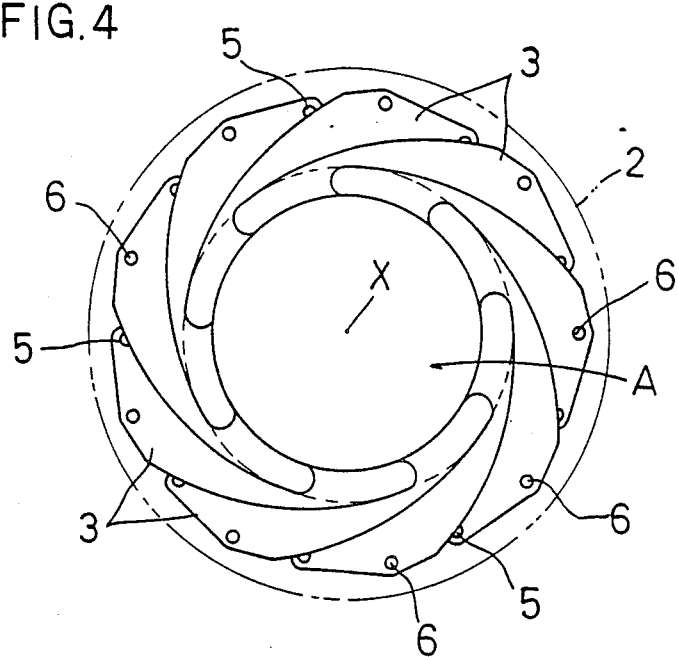
Figure 5:
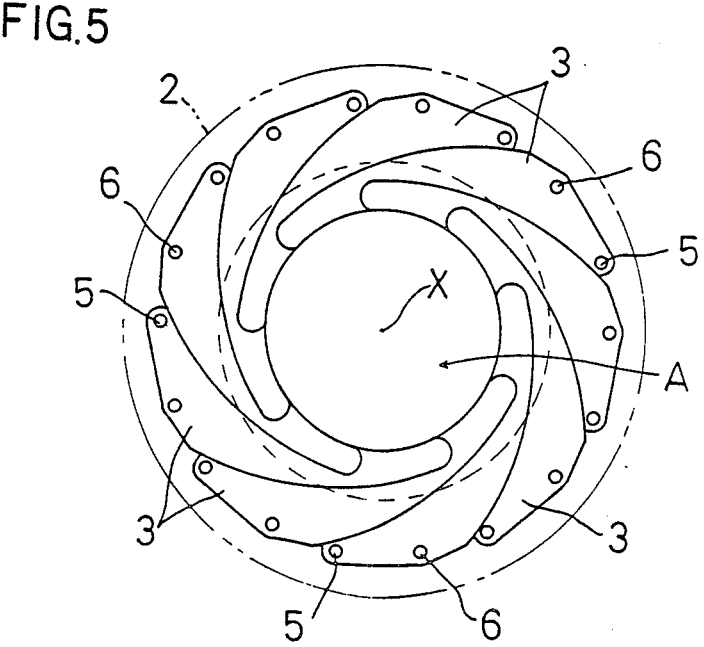
Figure 6:
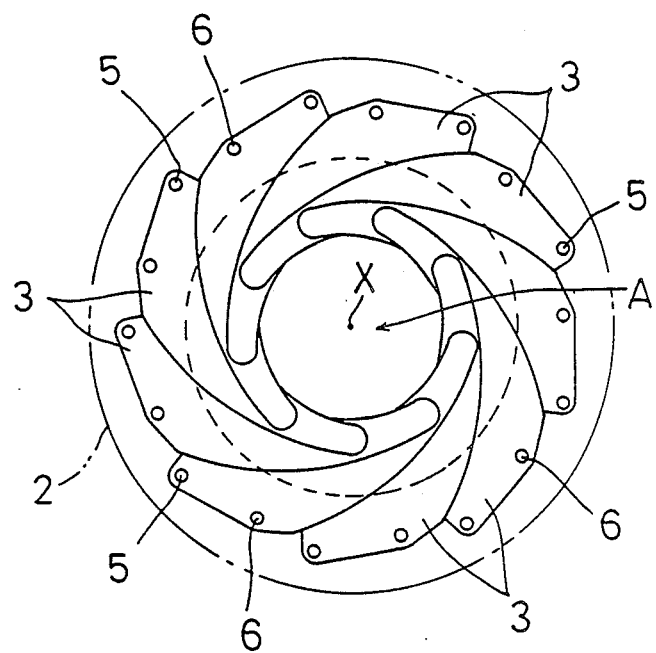
Figure 7:
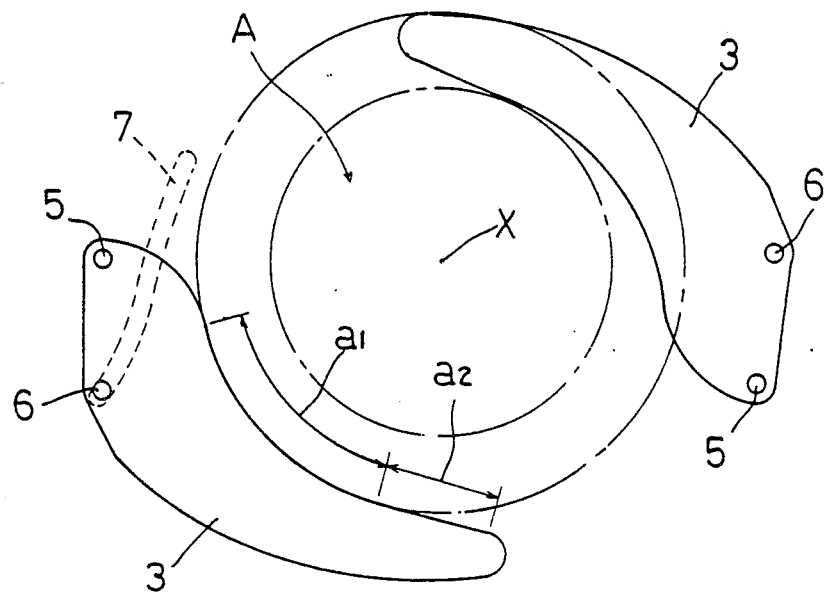
FIGS. 7 and 8 show a conventional stop device, the former being a front view of its stop blade configuration and the latter being a front view of an aperture opening configuration.
Figure 8:
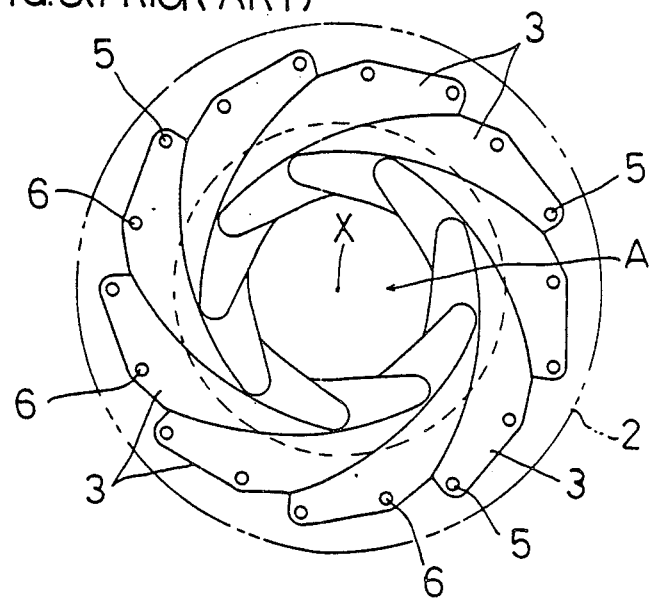

According to the above-described embodiment, in the full aperture position, as seen in FIG. 3, the aperture opening 'A' is defined by the first inner edge portions a1 to be perfectly circular. In an intermediate aperture position closed by $\frac{1}{2}$ AV from the full aperture position, as seen in FIG. 4, the aperture opening 'A' is defined by the first inner edge portions a1, the third inner edge portions a3 and by the second inner edge portions a2 to be substantially circular. In the predetermined intermediate aperture position closed by 1 AV from the full aperture position, as seen in FIG. 5, the small aperture opening 'A' is defined by the second inner edge portions a2 to be the perfect circle having the predetermined radius R2. In still another intermediate aperture position closed by 2 AV from the full aperture position, as seen in FIG. 6, the aperture opening 'A' is defined by top parts of the second inner edge portions a2 to be a little angular but substantially circular.

In the above embodiment, the second inner edge portion a2 is formed as the arc of the predetermined radius R2 only within the range of its lengthl. In place of this, it is possible to form also portions in continuation with both end portions of the second inner edge portion a2 to be arcuate having the predetermined radius R2.

It is also possible to form most of the intermediate part of the second inner edge portion a2, i.e. the part shorter than the length l as the arc of the predetermined radius R2 while the remaining shorter end parts as an arc of a different radius or formed straight, whereby the second inner edge portion a2 is formed to be a complex arc similar to the arc of the predetermined radius R2.

In a further embodiment, the second inner edge portion a2 is formed as an arc tracking a circle having a radius similar to the predetermined radius R2 about the optical axis 'X' in the predetermined intermediate aperture position, that is to say, the second inner edge portion a2 is formed as an arc similar to that having the predetermined radius R2.

I claim:

1. A stop device comprising a plurality of stop blades adapted for defining an aperture opening with inner edges thereof, said stop blades being arranged about an optical axis with adjacent pairs partially overlapping each other in the direction of the optical axis, and pivotable about pivotal axes positioned in end regions thereof so as to move toward and away from the optical axis, each inner edge of said stop blades including a first uninterrupted inner edge portion for partially defining an aperture opening when said stop device is set to a full aperture position or to an aperture position equivalent thereto and a second uninterrupted inner edge portion disposed more distantly from said pivotal axis than said first inner edge portion for partially defining a small aperture opening when said stop device is set to a predetermined intermediate aperture position and an end edge portion formed continuously from said second inner edge portion to a free end of said stop blade having a form similar to that of an imaginary prolongation of said first inner edge portion, wherein said first inner portion is formed arcuate for defining, along with only the first inner edge portions of the other stop blades, a circular aperture opening having a predetermined radius about the optical axis when said stop device is set to said full aperture position or said position equivalent thereto, said second inner edge portion is formed at least partially arcuate for defining along with second inner edge portions of the other stop blades a substantially circular aperture opening having a radius smaller than said predetermined radius formed by said first inner edge portions about the optical axis when said stop device is set to said predetermined intermediate aperture position.

2. A stop device, as defined in claim 1, wherein said respective second inner edge portions are formed arcuate over a full length thereof.

3. A stop device, as defined in claim 1, wherein said respective second inner edge portions include a center part and end parts continuous therewith, said center part being formed arcuate and said end parts being formed straight.

4. A stop device, as defined in claim 1, wherein said respective second inner edge portions include a center part and end parts continuous therewith, said center part being formed arcuate and said end parts being formed arcuate having a curvature different from that of said center part.

5. A stop device, as defined in claim 2, wherein said respective stop blades further include a third inner edge portion between said first inner edge portion and said second inner edge portion, said third inner edge portion having a curvature for providing a smooth transition between said first inner edge portion and said second edge portion.

6. A stop device, as defined in claim 1, wherein said predetermined intermediate aperture position corresponds to an aperture position stopped down by 1 AV from the full aperture position.

7. A stop device comprising plurality of stop blades adapted for defining an aperture opening with inner edges thereof, said stop blades being arranged about an optical axis with adjacent pairs partially overlapping each other in the direction of the optical axis, and pivotal about pivotal axes positioned in end regions thereof so as to move toward and away from the optical axis, each inner edge of said strap blades including a first uninterrupted inner edge portion for partially defining an aperture opening when said stop device is set to a full aperture position or to an aperture position equivalent thereto, a second uninterrupted inner edge portion disposed more distantly from said pivotal axis than said first inner edge portion for partially defining a small aperture opening when said stop device is set to a predetermined intermediate aperture position and a third uninterrupted inner edge portion between said first inner edge portion and said second inner edge portion having a shape for providing a smooth transition between said first inner edge portion and said second inner edge portion, so that each inner edge provides a smooth transition from an end of said first inner edge portion close to said pivotal axis to a free end of said stop blade, wherein said first inner edge portion is formed arcuate for defining along with only the first inner edge portions of the other stop blades a circular aperture opening having a predetermined radius about the optical axis when said stop device is set to said full aperture position or said position equivalent thereto, and said second inner edge portion is formed at least partially arcuate for defining along with only the second inner edge portions of the other stop blades a substantially circular aperture opening having a radius smaller than said predetermined radius formed by said first inner edge portions about the optical axis when said stop device is set to said predetermined intermediate aperture position.

* * * * *